APPARATUS FOR PEELING SHRIMP

Original Filed May 25, 1967 2 Sheets-Sheet 1

INVENTOR
James M. Lapeyre

BY Wilkinson, Mawhinney & Theibault
ATTORNEYS

APPARATUS FOR PEELING SHRIMP
Original Filed May 25, 1967
2 Sheets-Sheet 2
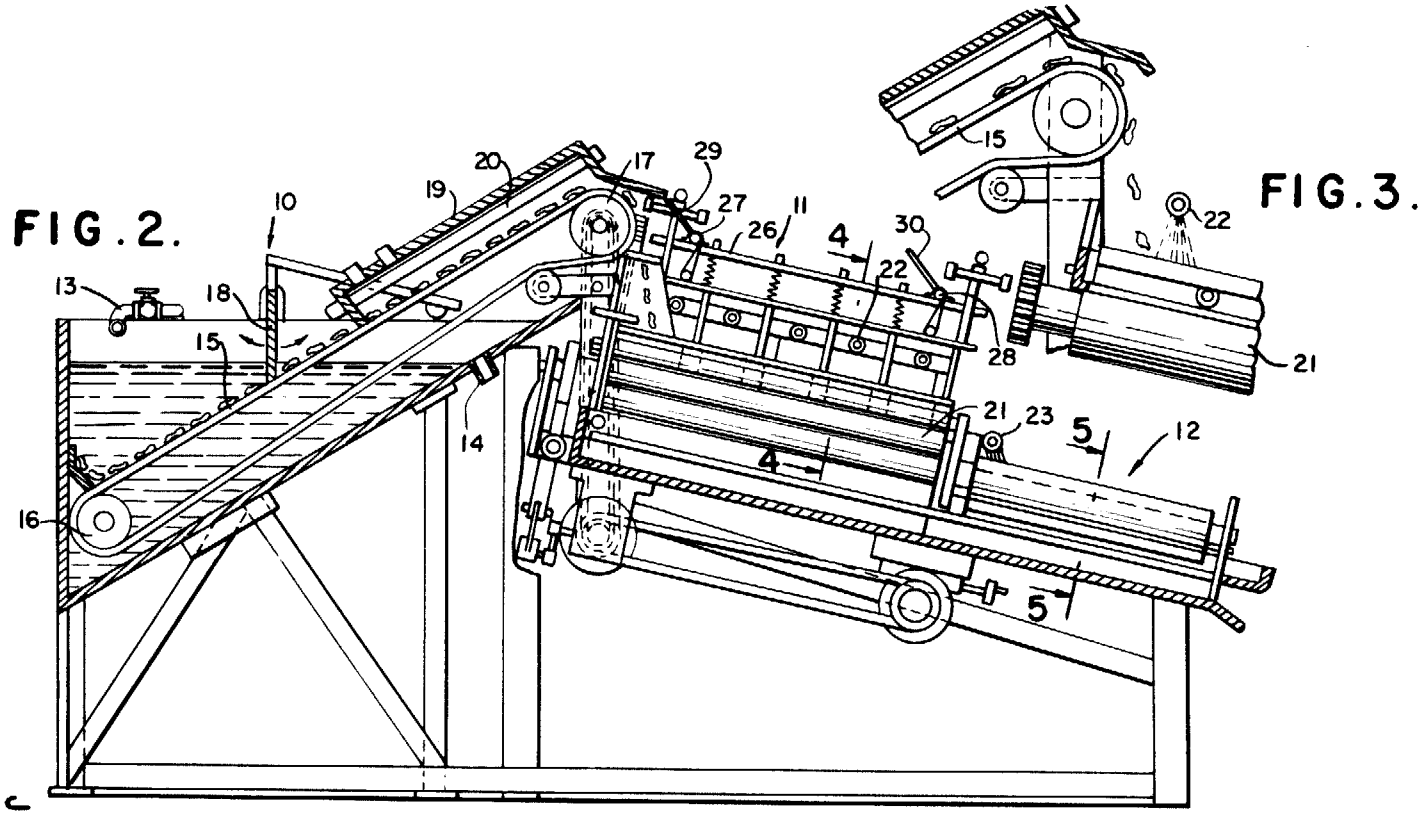
FIG. 2.
FIG. 3.
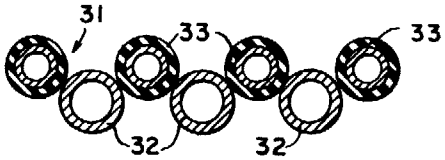
FIG. 5.
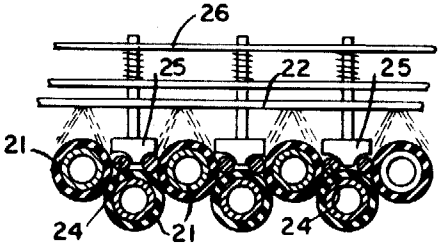
FIG. 4.
INVENTOR
James M. Lapeyre
BY Wilkinson, MacKinney & Theibault
ATTORNEYS United States Patent Office Re. 26,971
Reissued Oct. 20, 1970

26,971
APPARATUS FOR PEELING SHRIMP

James M. Lapeyre, New Orleans, La., assignor to The Laitram Corporation, New Orleans, La., a corporation of Louisiana Original No. 3,383,734, dated May 21, 1968, Ser. No. 641,231, May 25, 1967. Application for reissue Feb. 6, 1970, Ser. No. 10,667
Int. Cl. A22c *29/00*
U.S. Cl. 17—73 4 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a shrimp peeling machine for peeling *either raw or* precooked shrimp having two peeling sections, the first of which receives the shrimp [substantially at cooking temperature] and has pressure means for applying more peeling pressure at the introductory end than at its discharge end; while the second peeling section has no pressure means for urging the shrimp into the peeling nips defined by peeling rolls which have a different coefficient of friction between each other and which are shorter in length than the peeling rolls of the first peeling section.

The present invention relates to apparatus for peeling shrimp and more especially to an apparatus developed for the bulk processing of Pandalus borealis specie of shrimp, [which are best peeled, if a quality end product is desired, after they have been precooked or at least partially cooked.] *either raw or precooked.* In some plants partial precooking is desirable because the shrimp are subjected to a further cooking after peeling is completed.

It could very well be that the present invention may prove efficacious on other species of shrimp. However, my work has concentrated on this particular species because of the great quantities of shrimp available and the long need of that segment of the shrimp industry which produces Pandalus borealis to automate its peeling operation without a sacrifice in the quality of the end product.

The present invention also relates to a shrimp peeling machine for peeling *either raw or* precooked or partially precooked shrimp having two peeling sections; the first of which receives the shrimp *either raw or* at a substantially elevated temperature and has pressure means for applying more peeling pressure at the introductory end than at its discharge end; the second section has no pressure means for urging the shrimp into contact with the peeling rolls which have different frictional characteristics than the peeling rolls in the first peeling section, and which are considerably shorter in length than the peeling rolls of the first peeling section.

The present invention has for an object to provide an improved apparatus, *when employed with a cooker,* for peeling precooked shrimp and represents a significant improvement in the art over my prior issued U.S. Pat. No. 3,276,878 in that peeling actions of two different characters are imposed upon the cooked shrimp.

A further object of the present invention is to provide an apparatus which requires much less water than is needed for processing shrimp by conventional bulk fed peeling machines having approximately the same capacity in pounds of shrimp per hour, *when peeling raw shrimp* where a high quality end product is produced.

A still further object of the present invention is to provide an apparatus which is especially efficacious for peeling Pandalus borealis shrimp and which is more compact in size and, therefore, requires less floor space and less head room than do conventional bulk fed shrimp peeling machines having approximately the same capacity in pounds of shrimp per hour when a high quality end product is produced.

A still further object of the present invention is to provide a simplified apparatus for processing *raw or* precooked or partially precooked Pandalus borealis shrimp and one which will require less maintenance, because of its having fewer parts, than [is] *are* required on conventional bulk fed shrimp peeling machines.

*When employing the apparatus of the present invention with a cooker,* [In] *preceding* the first peeling section, which receives the shrimp directly from a steamer while the shrimp are still substantially at an elevated temperature, I have found that the shrimp peel much better when subjected to a greater pressure while hot, and to a lesser pressure as they cool. Accordingly, I have provided means [for] *which permits* differentially loading the pressure means for urging the shrimp into contact with the peeling surfaces in the first peeling section.

In the second peeling section I have found that pressure on the shrimp as they are peeled is detrimental when peeling cooked or partially cooked shrimp and *when peeling raw shrimp of small size,* I have also found that the length of the second peeling section, as compared with the length of the first section, must be substantially reduced in order to produce a product of the best quality. I have also found that in the second peeling section the lower peeling rolls, which mate or cooperate with the upper peeling rolls, should preferably have a lesser coefficient of friction than the upper peeling rolls. By way of example, the lower peeling rolls should be of smooth or polished surfaces, such as stainless steel, and the upper peeling rolls should be rubber covered. This combination affords the advantage of a mechanically smooth and substantially noiseless combination, while still effecting a much gentler peeling action on the shrimp, which results in a higher quality end product than would be obtained from a machine where both the lower and upper peeling rolls were of rubber.

With the foregoing and other advantages in view, which will become immediately apparent to those skilled in the art as the following more specific description proceeds, the critical features of the invention in both structure and mode of operation will be hereinafter more fully described.

In the drawings I have illustrated only one mechanical embodiment of which the invention is susceptible and in such drawings like parts are denoted by the same reference characters throughout the several views in which:

FIG. 2 is a side elevational view of the machine with parts broken away and parts shown in section;

FIG. 3 is a fragmentary side elevational view, taken at an enlarged scale showing the shrimp introduction end of the first peeling section;

FIG. 4 is a fragmentary transverse section taken through the first peeling section on the lines 4—4 in FIG. 2; and FIG. 5 is a fragmentary transverse section taken through the second peeling section on the lines 5—5 in FIG. 2.

Figure 1:
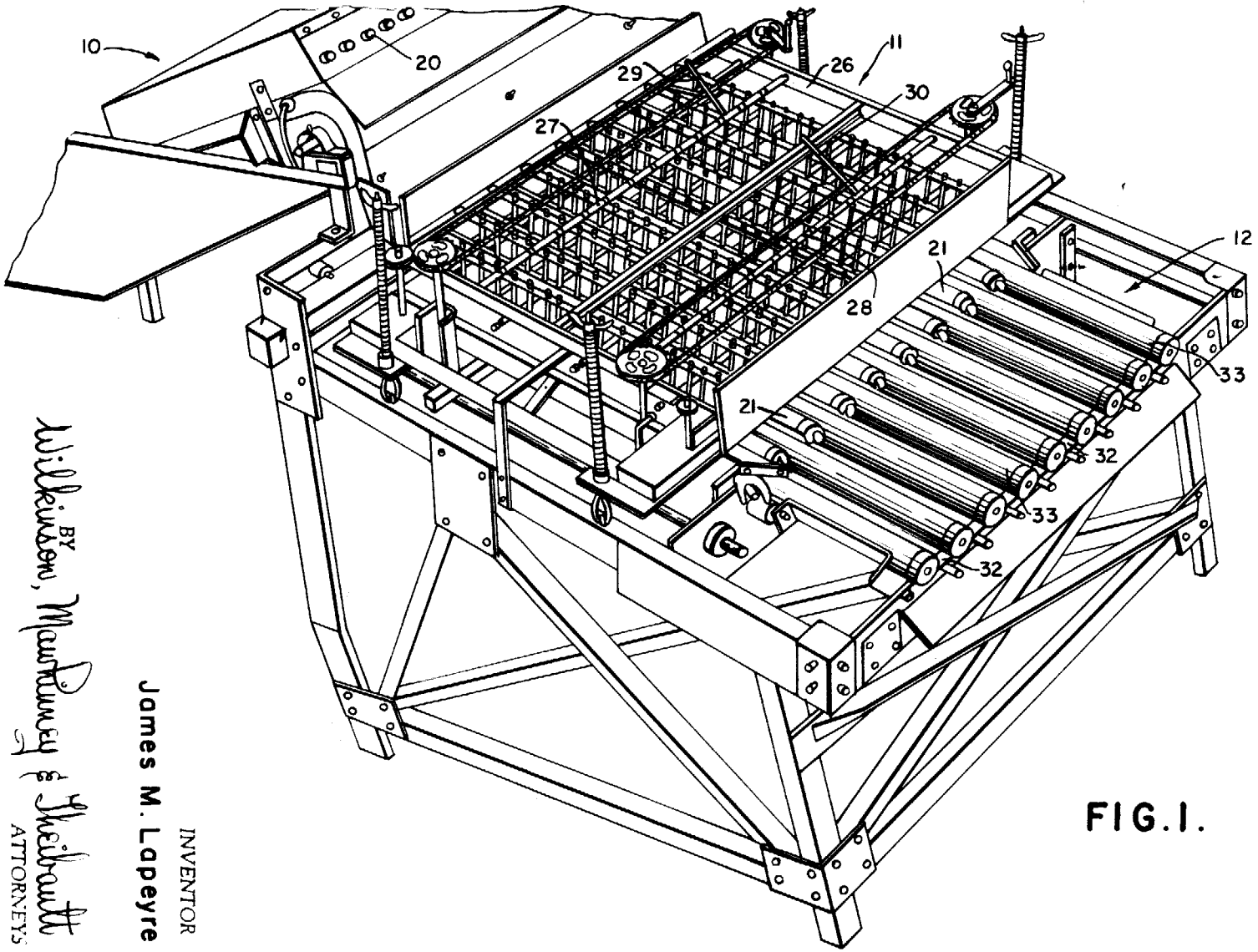
FIG. 1 is a perspective view with parts broken away of a machine for peeling [precooked] shrimp constructed in accordance with the present invention.

Referring now for the moment to FIG. 2, 10 designates a shrimp feed tank and cooker, 11 a first peeling section and 12 a second peeling section.

The feed tank has a water supply pipe 13, and an overflow pipe 14 for maintaining the desired level of liquid in the feed tank. Mounted within the tank is a mat-type or metallic mesh conveyor 15, which passes about rolls 16 and 17. An oscillating feed paddle 18 controls the rate of feed of shrimp onto the conveyor feeding into the peeling machine. Shrimp in bulk with the shells on are dumped into the feed tank between the feed paddle 18 and the rear wall of the tank.

Lying between the feed paddle 18 and the upper roll 17 of the conveying member 15, I have provided a hood structure 19 into which I have installed perforated steam pipes 20 for steaming the shrimp on the conveyor 15. Shrimp on the conveyor 15 are therefore subjected to steam issuing from the perforation in the pipes 20 housed within the hood 19.

As seen in FIGS. 1, 2 and 3, it will be noted that the shrimp, or at least the outer portions of the shrimp, which have been elevated to a cooking temperature, for instance by steam emitted from steam pipes 20 and which are at a temperature of a range approximating the boiling point of water, are introduced immediately while at the elevated temperature onto the peeling rolls 21 of the upper section 11 of the peeling machine.

*When peeling either raw or precooked shrimp,* [The] *the* upper, or first peeling section 11, as best seen in FIGS. 1, 2 and 4, consists of rubber covered main peeling rolls 21 having insert rolls 24, FIG. 4, and pressure fingers 25 mounted in a pressure finger frame 26. Pressure control members 27 and 28 are provided and have operating handles 29 and 30 so that the upper or introductory portion of the first peeling section pressure frame may be loaded to impose a greater pressure on the upper or introductory portion off this peeling section than is imposed upon the shrimp at the lower or discharge portion of the first peeling section as shown in U.S. Pat. No. 3,070,832. In this first peeling section, the *large diameter* main peeling rolls [are all] *may be* rubber covered and have the same coefficient of friction, and when properly fed and adjusted for pressure, the bulk of the peeling is done in the upper portion of this first peeling section.

Turning now to the second peeling section 12 and noting particularly FIGS. 2 and 5, the lower peeling rolls 32 are of a different character than the main peeling rolls 21 in the first section in that they are made of polished metal and cooperate or mate with rubber covered rolls 33 to form the peeling channels and nips for the second section. This construction shown in FIG. 5 provides a more gentle peeling action upon the shrimp which have been subjected to a more vigorous action in the first section wherein the pressure fingers are employed as a pressure means, for urging the shrimp into frictional and rubbing engagement with the rubber covered rolls 21 to loosen and/or remove as much shell as possible while the shrimp are still [hot and] resilient [.] *in the case of cooked shrimp and while some shell remains as protective cover on raw shrimp.* At this point, it is important to note several things about this peeling section. It will be noted that there are no insert rolls in the second peeling section. It will also be noted that the length of the peeling rolls 32 and the cooperating rolls 33 in the second section are materially shorter than the length of the main peeling rolls 21 in the first peeling section. It is also important to note the difference in the friction characteristics of the rolls 32, 33 in the second section and the rolls 21 in the first peeling section which cooperate with the pressure fingers to rub against the shrimp shells. This produces in the second section peeling of a character different from the character of peeling that takes place in the first peeling section. The fact that the second section peeling rolls are one-half (½) or less than one-half (½) the length of the first peeling section rolls controls the duration of the period of the second peeling action since, due to the inclination of the peeling rolls and the rate of water flow issuing from pipe 23, as best seen in FIG. 2, the period of time that the shrimp will remain in the peeling channels and travel the length of the peeling sections will be controlled.

I have found that substantial savings of water is effected in the shortening of the machine without any sacrifice as to the quality of the peeling job done in both sections.

Although I have disclosed herein the best forms of the invention known to me at this time, I reserve the right to all such modifications and changes as may come within the scope of the following claims.

What is claimed is:

1. For use with a shrimp cooker, a machine for peeling precooked shrimp comprising:

(a) a first peeling section having members forming peeling nips positioned to receive shrimp hot from a cooker, said first peeling section having pressure means for urging the shrimp into contact with said members forming the peeling nips;

(b) a second peeling section positioned to receive shrimp from the discharge end of said first peeling section and having peeling nips defined by members having different coefficients of friction between themselves, said second peeling section being devoid of pressure means for urging the shrimp into contact with the members forming the peeling nips; and (c) said second peeling section being up to one-half the length of the said first peeling section.

2. An apparatus as claimed in claim 1 wherein said members forming the peeling nips are rubber covered longitudinal rolls and insert rolls in the first peeling section and a combination of smooth non-rubber covered rolls and rubber covered rolls in the second peeling section.

*3. A machine for peeling shrimp comprising:*

*(a) a first peeling section having members forming peeling nips positions to receive shrimp, said first peeling section having pressure means for urging the shrimp into contact with said members forming the peeling nips;*

*(b) a second peeling section positioned to receive shrimp from the discharge end of said first peeling section and having peeling nips defined by members having different coefficients of friction between themselves, said second peeling section being devoid of pressure means for urging the shrimp into contact with the members forming the peeling nips; and*

*(c) said peeling section being up to one-half the length of the said first peeling section.*

*4. An apparatus as claimed in claim 3 wherein said members forming the peeling nips are rubber covered longitudinal rolls and insert rolls in the first peeling section and a combination of smooth non-rubber covered rolls and rubber covered rolls in the second peeling section.*

References Cited

The following references, cited by the Examiner, are of record in the patented file of this patent or the original patent.

UNITED STATES PATENTS

| | | | |
|---|---|---|---|
| 2,858,563 | 11/1958 | Rodriguez | 17—73 |
| 3,018,510 | 1/1962 | Lapeyre et al. | 17—73 |
| 3,276,878 | 10/1966 | Lapeyre | 17—73 X |

LUCIE H. LAUDENSLAGER, Primary Examiner